United States Patent [19]

Dash

[11] 4,109,280

[45] Aug. 22, 1978

[54] TELEVISION INTERFACE DEVICE

[75] Inventor: Glen R. Dash, Watertown, Mass.

[73] Assignee: Massachusetts Institute of Technology, Cambridge, Mass.

[21] Appl. No.: 700,647

[22] Filed: Jun. 28, 1976

[51] Int. Cl.² .................. H04N 7/10; H04N 5/44; H04B 1/06

[52] U.S. Cl. .................... 358/86; 358/188; 375/308

[58] Field of Search ............... 325/461, 315, 316, 308; 358/189, 86, 188; 273/DIG. 28; 332/31 R, 31 T, 53

[56] References Cited

U.S. PATENT DOCUMENTS

| 3,237,106 | 2/1966 | Ghaem-Maghami | 325/461 X |
| 3,562,650 | 2/1971 | Gossard et al. | 358/86 X |
| 3,730,980 | 5/1973 | Kirk, Jr. | 325/308 X |
| 3,882,266 | 5/1975 | Walding | 358/86 |
| 4,047,127 | 9/1977 | Alexander | 332/31 T |

OTHER PUBLICATIONS

Dept. of the Army Technical Manual TM 11-690, Mar. 1959, pp. 171-173.

Primary Examiner—Richard Murray
Assistant Examiner—Aristotelis M. Psitos
Attorney, Agent, or Firm—Arthur A. Smith, Jr.; Robert Shaw

[57] ABSTRACT

An interface device that serves to connect a local RF signal and a broadcast signal to a television receiver as alternate inputs to the receiver.

9 Claims, 2 Drawing Figures

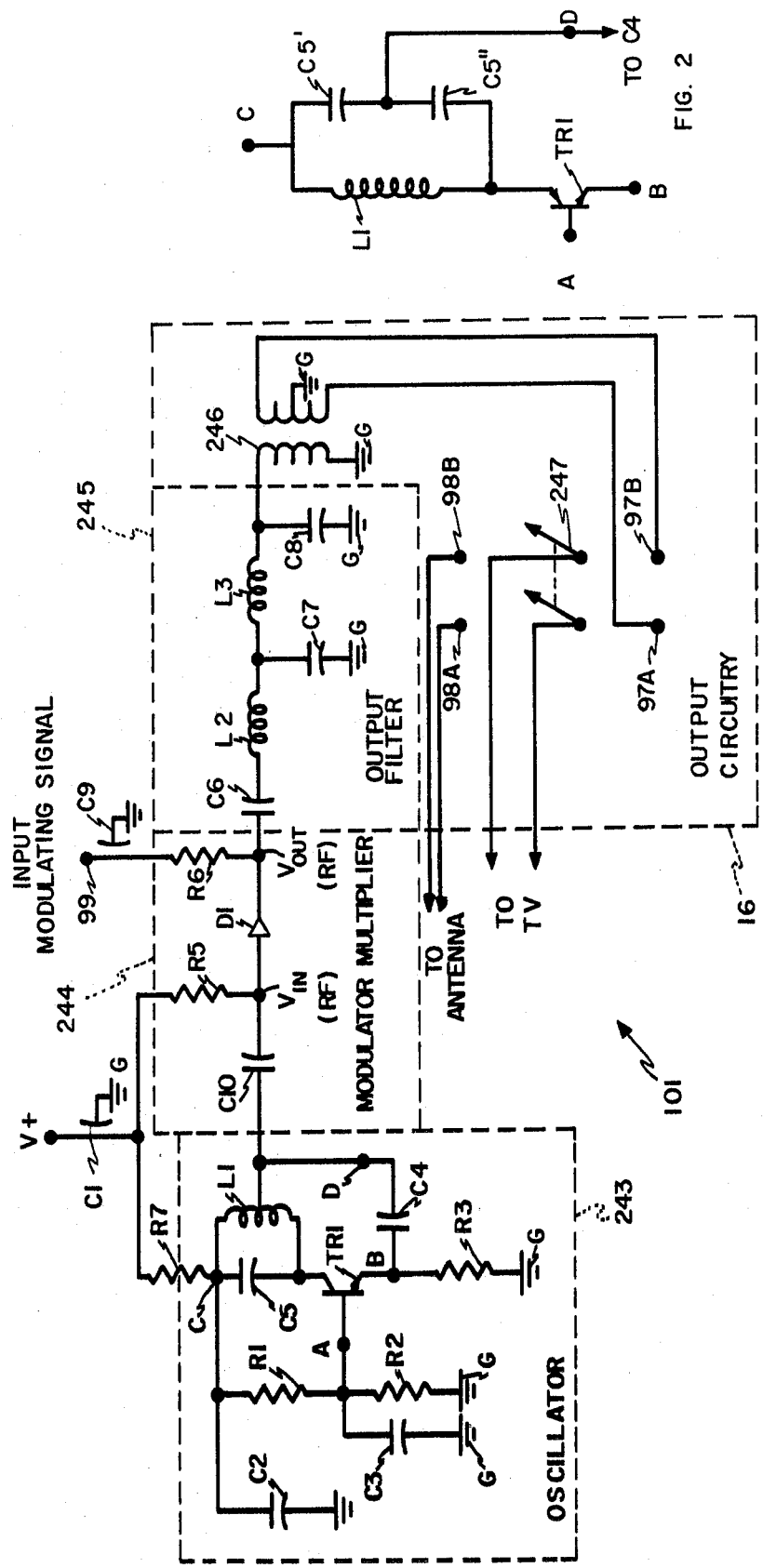

TELEVISION INTERFACE DEVICE

The present invention relates to an interface system whereby multiple inputs can be introduced to a television receiver.

In an application of Ser. No. 640,105 (Dash et al), filed Dec. 11, 1975 (now U.S. Pat. No. 4,034,983), there is disclosed an electronic game wherein an electronic controller, connected to introduce RF signals through the antenna circuit of a television receiver, introduces to the receiver electric signals that produce on the screen thereof the simulation of a playing area and a simulation of active components of a game. In FIG. 8 of the application an interface circuit is disclosed to satisfy the enabling portion of the Patent Act, but that circuit is not claimed in its own right; a slightly modified version of said interface circuit is the subject of the present invention.

Accordingly, it is an object of the present invention to provide an interface circuit for connecting the electronic controller described in said application to a television receiver adapted to operate with a channel allocated for television broadcasting by the Federal Communications Commission.

Another object is to provide an interface device of broader scope.

These and still further objects are addressed hereinafter.

By way of summary the above objects are achieved in an interface device for use in connection with a television receiver and operable selectively to connect a local RF signal and a broadcast signal to the receiver. The device includes a tapped-Hartley or a Colpitts oscillator operable to produce an RF signal. A switch is provided to select either the local RF signal or a broadcast signal.

The invention is hereinafter discussed with reference to the accompanying drawing in which:

FIG. 1 is a schematic representation of a television interface device of the present invention and includes a tapped-Hartly oscillator; and FIG. 2 shows a Colpitts oscillator to replace the tapped-Hartley oscillator.

Turning now to FIG. 1, an interface device shown at 101 for use in connection with a television receiver (not shown) adapted to operate within a channel allocated for television broadcasting. In the context of the Dash et al patent application, the interface device 101 can receive, as input, a local modulating signal at an input 99 and a broadcast signal at terminals 98A and 98B and can selectively (by way of a double pole, double through switch, say) connect a locally generated radio frequency signal (i.e., the local radio frequency (RF) signal generated by the internal oscillator 243 discussed below, which RF signal is modified by the local modulating signal introduced at the input 99 in the manner discussed later herein) and the broadcast signal to the television receiver as alternate conditions of operation of the receiver. More particularly, the Dash et al patent application describes a television game whereby a local modulating signal from a local controller which is capable of being modified or changed by human operators is introduced at the input 99; the switch labeled 247 in FIG. 1 is placed in the "up" position (that is, closed upon terminals 98A and 98B) to connect the broadcast signal to the television receiver and in the "down" position (that is, closed upon the terminals shown at 97A and 97B) for reception of the local radio frequency signal. It will be appreciated that the interface device 101 has use in connection with systems other than that shown in said patent application.

The interface circuit 101 includes the internal oscillator 243, a modulator (multiplier) 244, an output filter 245 and output circuitry 16. The circuit 101 receives an input modulating signal (e.g, from the controller in the Dash et al application) at the input 99, which input modulating signal is connected through a resistor R6 to the output of a diode D1 whose input, in turn, is connected through a resistor R5 to V+ through a feed-through-type capacitor C1; as hereinafter shown, the combination of the resistors R5 and R6, the diode D1 and a feedthrough capacitor C9 determine the bandwidth of the multiplied signal hereinafter discussed. The input modulating signal will include vertical and horizontal sync pulses as well as the video modulation that is, the sync pulses and the video modulation combined form a (composite video signal). In the usual system, the sync pulses and the video modulation are combined in an adder or the like (not shown here) and the input modulating signal at the input 99 is a composite signal (that is, the composite video signal). The input modulating signal at the input 99 is multiplied by the multiplier 244 with a signal from the internal oscillator 243 to provide a further combined signal (which is referred to herein as a multiplied or modulated signal, that is, the RF signal $V_{OUT}$ hereinafter) which is filtered by the output filter 245 and delivered to the output circuitry 16 and thence to the television receiver. All the elements in the system 101 are shielded to prevent RF transmission, and in accordance with FCC regulations; in this connection, feedthrough capacitors C9 and C1 serve to permit introduction respectively of the input modulating signal and the system power voltage V+ to the interface device 101 while suppressing RF radiation therefrom, and, hence, serve as part of the RF shielding means.

A few circuit details are found in this and the next several paragraphs. The internal oscillator 243 comprises a transistor TR1 (which serves as the active element), resistors R1 and R2 to bias the circuit in operation and a capacitor C3 to bypass an ac signal to ground G (which is a common conductor in the circuit 101). A capacitor C4 serves as a feedback to the emitter of the transistor TR1 from tapped-coil inductance L1, a capacitor C5 and the inductance L1 forming a resonant circuit. A resistor R3 determines the bias current through the transistor TR1, and capacitor C2 and a resistor R7 decouple any RF from the supply line.

The oscillator 243 in FIG. 1 is a tapped-Hartley type. FIG. 2 shows a Colpitts oscillator to replace the tapped-Hartley type. In the Colpitts oscillator the capacitor C5 is replaced by capacitors C5' and C5" and the common connection between the two is connected to the junction of capacitors C4 and C10. The operation of the Colpitts type oscillator is essentially the same as the tapped-Hartley type. To modify the Hartley type oscillator to a Colpitts, the circuitry between points A, B, C, and D in FIG. 1 is replaced by the circuitry between point A, B, C, and D in FIG. 2.

The resistor R5 and a capacitor C10 in the multiplier 244 serve as a network and provide an RF signal $V_{in}$ to the diode D1 connected to the resistor R6, to provide a voltage $V_{out}$ that is connected to the output filter 245. (Both of the voltages $V_{in}$ and $V_{out}$ are RF signals.) The resistor R5 and capacitor C10 reduce the voltage level at the anode of the diode D1. Diode D1's forward resistance ($R_{D1}$) depends linearly on the current passing through it, that is, the relationships in the circuitry of FIG. 1 are such that the electric current through the diode D1 bears a linear relationship to the value of the current through the resistor R6 (the designation R6 indicates the resistor so labeled as well as the resistance value thereof). The diode D1, then, is effectively a current controlled resistor and the amount of radio frequency (RF) signal which is present at the cathode thereof is $$V_{out} = (R6/R_{D1} + R6) V_{in},$$

wherein $R_{D1} \approx 25(mV)/I(ma)$.

The modulator multiplier 244 is, thus, a diode type in which the modulating signal applied at the input 99 passes through the diode D1 to provide a low frequency current which multiplies the high frequency signal, resulting in amplitude modulation. Said another way, the local RF signal is amplitude modulated by a low-frequency modulating signal to provide an amplitude modulated signal, the signal $V_{OUT}$.

The output filter 245 is a low pass LC type and icludes a capacitor C6 which decouples the dc in the output of the multiplier 244 and allows the RF power therein to pass through the filter 245 which removes harmonics therefrom. The filter 245 further includes inductances L2 and L3 and capacitors C7 and C8. The output filter 245, among other things, acts to limit the harmonics in the signal delivered to the output of the device 101 in order to prevent broadcast of such harmonics in channels in the television receiver other than the channel allocated for the device.

The output balun shown at 246 matches the oscillator 243 to the television receiver 300-ohm input. The switch 247, as above noted, permits alternate operation between a local RF signal and a television broadcast signal.

Further modifications of the invention herein described will occur to persons skilled in the art and all such modifications are deemed to be within the spirit and scope of the invention as defined by the appended claims.

What is claimed is:

1. An interface device for use in connection with a television receiver and operable to connect selectively a modulated local RF signal $V_{out}$ and a broadcast signal to the receiver as alternate input signals to the receiver, that comprises, in combination: oscillator means to produce a local RF signal $V_{in}$; and diode multiplier means comprising a diode having a forward resistance $R_{D1}$ that varies linearly with the current passing through the diode, said diode multiplier means being adapted to receive as input a modulating signal and the local RF signal at a value $V_{in}$ and to multiply the two to provide as output the signal $V_{out}$, said diode multiplying means further including a resistor having a resistance value R6 connected between the input of the modulating signal and the output of the diode, said diode acting as a current controlled resistor and the amount of the RF signal $V_{out}$ appearing at its cathode being found in the expression $$V_{out} = (R6/R_{D1} + R6) V_{in}.$$

2. An interface device as claimed in claim 1 wherein said diode multiplier means includes a resistor-capacitor network connected to receive the local RF signal, to reduce the voltage level thereof, and to produce the signal $V_{in}$ that is connected to the input or anode of the diode.

3. An interface device as claimed in claim 1 that further includes filter means connected to receive the RF signal $V_{out}$ and operable to remove harmonics therefrom.

4. An interface device as claimed in claim 3 having switch means connected to receive the filtered RF signal $V_{out}$ from the filter means and connected, as well, to receive said broadcast signal, said switch means serving to deliver selectively either the filtered signal $V_{out}$ or the broadcast signal as output from the interface device.

5. An interface device as claimed in claim 4 that further includes an output balun to match the output impedance of the filter means to the television receiver and in which the modulating signal is a low frequency signal that effects amplitude modulation of the local RF signal.

6. An interface device as claimed in claim 1 that further includes shield means to prevent RF transmission from said device to the environment surrounding said device.

7. An interface device for use in connection with a television receiver adapted to operate within a channel allocated for television broadcasting and operable to connect selectively a local RF signal and a broadcast signal to the receiver as alternate input signals to the receiver, that comprises, in combination: oscillator means to produce said local RF signal; diode multiplier means comprising a diode connected to receive at its output an input sync pulse and video modulation that form a composite video signal that serves as a modulating signal and to receive at its input the local RF signal and being operable to multiply the two to effect modulation of the RF signal by said modulating signal, said diode having a forward resistance that depends on the current passing through it, said diode multiplier means including said diode and a resistor connected to the diode output such that the modulating signal is transmitted to the diode output through the resistor which serves to determine, in part, the forward resistance of the diode multiplier means and hence the modulating effect of the modulating signal upon the local RF signal; output filter means connected to receive the multiplied (i.e., modulated) signal from the diode multiplier means and operable to remove harmonics therefrom; and switch means connected to select either the multiplied signal, after the harmonics have been removed therefrom, or the broadcast signal, as received, and to deliver the selected signal to the output of the interface device.

8. An interface device as claimed in claim 7 that includes another resistor connected to the diode input and serving to determine, in part, the forward resistance.

9. An interface device for use in connection with a television receiver and operable to connect a local RF signal to the receiver, that comprises, in combination: oscillator means to produce said local RF signal; and diode multiplier means comprising a diode connected to receive at its output or cathode an input sync pulse and video modulation that form a composite video signal that serves as a modulating signal and to receive at its input or anode the local RF signal and being operable to multiply the two to effect modulation of the RF signal by said modulating signal, said diode multiplier means further including a resistor connected between the input of the modulating signal and said output or cathode.

* * * * *

UNITED STATES PATENT AND TRADEMARK OFFICE
CERTIFICATE OF CORRECTION

PATENT NO. : 4,109,280

DATED : August 22, 1978

INVENTOR(S) : Glen R. Dash

It is certified that error appears in the above-identified patent and that said Letters Patent are hereby corrected as shown below:

Column 3, line 12, the formula should read: $V_{out} = \frac{R6}{R_{D1} + R6} V_{in}$, Claim 1, last line, the formula should read: $V_{out} = \frac{R6}{R_{D1} + R6} V_{in}$.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks